UNITED STATES PATENT OFFICE.

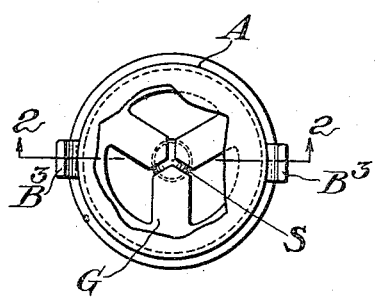
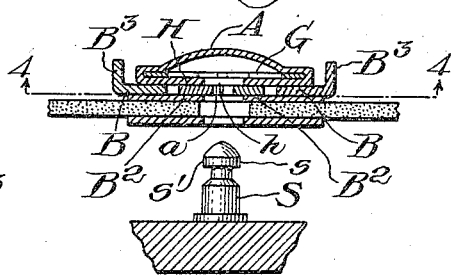
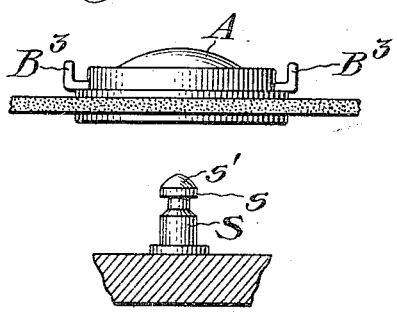
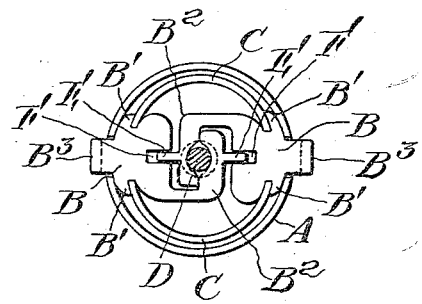
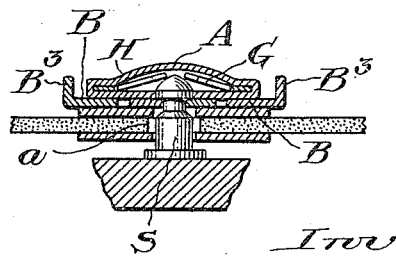

LOUIS ARKIN, OF BOSTON, MASSACHUSETTS.

FASTENER.

1,265,869.

Specification of Letters Patent.

Patented May 14, 1918.

Application filed June 25, 1917. Serial No. 176,820.

*To all whom it may concern:*

Be it known that I, LOUIS ARKIN, a citizen of the United States of America, and resident of Boston, in the county of Suffolk and State of Massachusetts, have invented new and useful Improvements in Fasteners, of which the following is a specification.

This invention relates to separable fasteners of the type shown in Letters Patent of the United States No. 1,225,741, granted to me on May 15, 1917, comprising essentially complemental stud and socket members, the latter provided with stud-retaining and releasing means and a resilient member adapted to force the stud from the socket without manipulation of said stud.

More particularly my invention relates to the stud-retaining and releasing means with which the socket is provided, and its principal object is to provide stud-retaining and releasing means whereby the stud while securely held within the socket is readily released to permit the resilient member provided for that purpose to force it from the socket, said stud-retaining and releasing means being so organized and arranged that the socket member shall have the thinness which is commercially essential.

Referring to the drawings which illustrate an embodiment of my invention,—

Figure 1 is a top view of the socket partially broken away;

Fig. 2 is a section on the line 2—2, Fig. 1, the stud member being shown in elevation disengaged from the socket;

Fig. 3 is a side view of the socket;

Fig. 4 is a section on line 4—4, Fig. 2;

Fig. 5 is a view similar to Fig. 2, but showing the stud within the socket.

A is a metal casing of usual contour having a stud-receiving aperture $a$, (Fig. 2) preferably of slightly greater diameter than the shank of the stud S so that the said stud while free to move into and out of the casing is held against substantial lateral or tipping movement within said aperture $a$. Within said casing is a pair of stud-retaining plates B located and movable in the same plane, pressed together and yieldingly held in normal position by one or more springs C (Fig. 4) which engage lugs B' provided on said plates. Each of said retaining plates has a notched, hook-like end B² whereby said plates are interlocked. Said ends engage each other when the plates are in normal position, as best shown in Fig. 4, the notches forming a stud aperture D located in the path of the stud and into which it is adapted to enter upon its insertion into the casing A.

Each of said hook-like ends B² is further provided with a guide E and the body portions of the plates have complemental guide channels F, the guide E of one plate extending into the complemental guide channel F of the other plate to insure the movement of said plates in the same line.

B³ are the stud releasers preferably formed integral with the plates B and extending outside said casing through slots in the wall thereof. Preferably the releasers are of the form shown having stops adapted to engage the wall of the casing when said releasers are pressed inward to release the stud as presently to be described.

Within the casing A and above said plates B is a resilient member G, preferably a spring plate best shown in Figs. 1 and 5, located in the path of the stud S and adapted to be engaged by the stud upon its insertion into the casing and to be stressed thereby.

Between said spring G and said plate B is a stud-holding plate H having an aperture $h$ (Fig. 2) into which the stud fits upon its insertion into the casing to anchor said stud and hold it against tipping.

The stud S is of the form shown having an enlarged head S' preferably flattened at the portion $s$ which fits within the aperture $h$ of the holding plate H.

When the stud S is inserted into the casing A through the aperture $a$, its head, entering the aperture D formed by the notched retaining plates B, forces said plates apart and passes between them into and partially through the holding plate H lifting the spring G. When the stud head has thus passed therebetween, the plates B close around the neck of the stud, and said stud is thus firmly retained within the casing with the spring G stressed thereby.

To release the stud, the releasers B³ are simultaneously pressed inward whereupon the hook-like ends B² of the plates B are opened, releasing the stud so that its head is free to pass between said plates and the spring G being thus released, jumps or forces the stud free of the socket.

A socket member constructed in accordance with my invention as above described is not only simple and strong but by reason of the fact that the stud-retaining plates with their guides are located and movable in the same plane, can be made very thin. This feature is of prime importance in all fasteners adapted and intended for use upon clothing; for when the fastener is employed upon dresses and the like it is essential that it be as thin as possible so as to be readily concealed from view. The provision of thin stud-retaining means is of especial importance in this particular type of fasteners; for the resilient member which jumps or forces the stud from the socket of necessity occupies a relatively large space within the casing, and the economy of space necessary to essential thinness must therefore be obtained in the organization and arrangement of the retaining and releasing means.

I claim:

1. A socket member of a fastener comprising a casing having a stud-receiving aperture, a pair of stud-retaining plates within said casing movable in the same plane, said plates having interlocking, normally engaged, hook-like ends notched to provide a stud aperture, a spring yieldingly to hold said plates in normal engagement and each of said hooklike ends having a guide movable in a guide channel in the complemental plate, stud releasers connected to said retaining plates and extending outside said casing, a stud holder disposed above said plates to prevent tipping of said stud within the casing and a spring plate adapted to be engaged and stressed by the insertion of the stud into the socket to force the stud from the socket without manipulation of said stud.

2. A fastener consisting of complemental stud and socket members, said stud member having a head provided with a flattened portion and said socket member comprising a casing having a stud receiving aperture, a pair of stud retaining plates within said casing movable in the same plane, said plates having interlocking normally engaged hook-like ends notched to provide a stud aperture, a spring yieldingly to hold said plates in normal engagement and each of said hook-like ends having a guide movable in a guide channel in the complemental plate, stud releasers connected to said retaining plates and extending outside said casing, a stud holder disposed above said plates and having an aperture for the flattened portion of the stud to prevent tipping of said stud within the casing, and a resilient member adapted to be engaged and stressed by the insertion of the stud into the socket to force the stud from the socket without manipulation of said stud.

Signed by me at Boston, Massachusetts, this twenty-second day of June, 1917.

LOUIS ARKIN.

Copies of this patent may be obtained for five cents each, by addressing the "Commissioner of Patents, Washington, D. C."